United States Patent [19]
Rieckhoff

[11] Patent Number: 5,855,221
[45] Date of Patent: Jan. 5, 1999

[54] ADJUSTABLE PRESET TIRE DEFLATOR AND CALIBRATION MEANS

[76] Inventor: Gordon Rieckhoff, 2 Rutledge Commons, Yaphank, N.Y. 11980

[21] Appl. No.: 843,753

[22] Filed: Apr. 18, 1997

[51] Int. Cl.$^6$ .................................................. F16K 15/20
[52] U.S. Cl. ................................. 137/2; 137/230; 251/75
[58] Field of Search .................................... 137/224, 225, 137/226, 230, 2; 251/75

[56] References Cited

U.S. PATENT DOCUMENTS

| | | | |
|---|---|---|---|
| 1,151,044 | 8/1915 | Relyea | 137/225 X |
| 1,229,860 | 6/1917 | Ashelman et al. | 137/230 X |
| 1,472,366 | 10/1923 | Kelsey | 137/230 X |
| 1,558,695 | 10/1925 | Manuel | 137/230 X |
| 1,686,659 | 10/1928 | Henemier | 152/431 |
| 1,724,063 | 8/1929 | Anderson | 137/224 |
| 1,729,469 | 9/1929 | Anderson | 137/224 |
| 1,873,303 | 8/1932 | De Langie | 137/225 |
| 2,505,949 | 5/1950 | De Vilbiss | 137/230 |
| 2,510,052 | 6/1950 | Navarro et al. | 137/225 |
| 4,569,363 | 2/1986 | Kleeman | 137/230 |
| 4,658,869 | 4/1987 | Soon-Fu | 141/98 |
| 4,708,169 | 11/1987 | Liu | 137/230 X |
| 5,115,832 | 5/1992 | Higdon | 137/227 |
| 5,411,051 | 5/1995 | Olney et al. | 137/225 |

OTHER PUBLICATIONS

G.H. Meiser & Co., Posen, IL, Label from Performance Tire Pressure Gauge, Model S60X, undated.

*Primary Examiner*—John Rivell
*Attorney, Agent, or Firm*—Alfred M. Walker

[57] ABSTRACT

A tire deflator includes a tubular housing with indicia markings showing a desired terminal pressure to preset a tire to a desired air pressure. Click stops are provided at air pressure intervals via indentations, which interact with springy pointer. A cap with a threaded cap is moved to move the cap to the desired click stop indentation. A hose terminates in a pneumatic chuck which attaches the tire deflator to a tire valve. In operation, the user simply turns the threaded cap relative to the tubular housing to the desired terminal pressure "click stop", as indicated by numbers on the tubular housing. The user then attaches the hose chuck to the tire valve by using the handle to lock on; the chuck has an internal pin which forces open the tire valve. The deflation process commences when pressure release pin on the bottom of the deflator is pressed in so that it snaps to its inward stable position. When the desired tire pressure is reached, the pin automatically snaps out sealing the pressure release aperture.

4 Claims, 4 Drawing Sheets

ADJUSTABLE PRESET TIRE DEFLATOR AND CALIBRATION MEANS

FIELD OF THE INVENTION

The field of the invention relates to apparatus to facilitate deflating vehicle tires to a desired level.

BACKGROUND OF THE INVENTION

Among prior art devices for deflating tires to a desired level are the tire pressure gauges on the market such as the model S60X from G. H. Meiser & Co. This gauge has a button on the side of the gauge stem to bleed air from the tire to facilitate deflation; the integral gauge is used to stop deflation at the desired point.

U.S. Pat. No. 1,686,659 of Henemer provides a deflating valve cap which screws into the tire valve to bleed air. The tire deflation mechanism of U.S. Pat. No. 4,569,363 of Kleeman is a convertible tire cap that can be unscrewed from a tire valve and screwed back in an inverted configuration where an internal projection interacts with the pin on the tire valve to facilitate bleeding of air for deflation. In both of these devices, a separate gauge must be used to monitor the desired terminal pressure.

U.S. Pat. No. 4,658,869 of Soon-Fu discloses a combination tire inflator, gauge and deflator. It is suitable for attachment to a compressor such as is often available at gas stations. A handle is used to discharge air from a tire. The degree of deflation is indicated on the integral tire pressure gauge.

U.S. Pat. No. 5,115,832 of Higdon et al. shows a tire pressure gauge and cap apparatus where a small tire cap device has an optical window which indicates the presence or absence of a minimum pressure inside the tire. It is not a deflation device.

All of the prior art deflation devices require the use of a visual indicating gauge to manually terminate the deflation process at the desired pressure.

OBJECTS OF THE INVENTION

It is therefore an object of the present invention to provide an air pressure regulator which can be preset to a desired deflation pressure of an inflated object, such as a motor vehicle tire.

It is another object to automatically terminate deflation when the desired terminal pressure is reached.

It is yet another object to efficiently calibrate the device during manufacture.

It is also an object to manufacture the device for low cost and a high level of reliability and accuracy.

SUMMARY OF THE INVENTION

In keeping with these objects and others which may become apparent, the present invention includes a deflation pressure regulator for automatically insuring accurate user-selected deflation pressure of a compressed air, such as air, within a pressurized gas container, such as a pneumatic vehicle tire. The deflation pressure regulator includes a threaded attachment member for attaching the regulator to the pressurized gas container, such as a pneumatic vehicle tire. A gas exhaust member permits exhaustion of a gas, such as air, from an over-pressurized gas container, such as an pneumatic vehicle tire inflated above a desired air pressure level. To select the proper inflation into the tire, a gas pressure selection adjuster is provided, with a spring compressed by a user-adjustable threaded cap.

While the present invention is useful for deflating tires, it can also be used to release other gases from pressurized gas containers.

A user-selectable deflation pressure scale is provided on the exterior of the gauge, for user pre-selection of desired tire deflator pressure. For example, if a tire is kept at 32 pounds per square inch (psi) on concrete and macadam roads, it can be deflated to a pre-selected lower deflated pressure, such as 15 psi for use upon a sandy beach or hilly dirt terrain.

An elongated pressure relief valve capable of being set to a user-selectable level of pressure is provided, so that the valve is forced open, thereby exhausting gas, such as air, from a pressurized container, such as a tire, when the tire's air pressure is above the pre-selected desired pressure level, such as, for example, 15 psi. In turn the regulator automatically closes and thus prevents further exhaust of air from the tire upon the reduction of tire pressure to the desired user selected level.

Preferably, the deflation regulator includes a cylindrical barrel having a threaded cylindrical cap bearing user readable indicia of pressure, such as a scale of desired air pressure measured in psi, and an internal spring connected to the pressure-variable valve. The spring exerts pressure and forces the barrel and cap apart so as vary increased spring compression. The user variably controls a threadable turning of the cap, when the user selects the desired pressure to be present in the pressurized container, upon completion of the deflation of the tire.

An automatic needle valve permits unrestricted entry of gas, such as air, into the pressurized container, such as a motor vehicle tire, but automatic regulation of exhaust of gas, such as air, from the pressurized container, such as the tire, only when the pressure of gas, such as air, in the pressurized container, such as the tire, exceeds the user selected level and the user has opened the exhaust means of the deflation regulator.

In operation, to insure an accurate desired level of deflation pressure of the vehicle tire, the tire must first be inflating to a pressure above the desired pressure. For example, the tire should have air at about 30 psi, before reducing the tire's air pressure to the desired air pressure of 15 psi. Then, the inflation pressure regulator is attached to the pressurized vehicle tire. The user then turns the threaded pressure adjustment cap of the deflator regulator to the desired gas pressure setting, such as 15 psi. The exhaust of the regulator is opened so as to permit over-pressure of gas, such as air, to exhaust from the pressurized vehicle tire, so that the remaining air pressure is 15 psi, as an example.

The exhaust of the regulator is closed after the deflation regulator has automatically terminated the exhausting of air from the pressurized vehicle tire, upon reaching the pre-selected desired level of gas pressure within the pressurized tire.

BRIEF DESCRIPTION OF THE DRAWINGS

The present invention can best be understood in conjunction with the accompanying drawings, in which.

DETAILED DESCRIPTION OF THE PREFERRED EMBODIMENT

Figure 1:
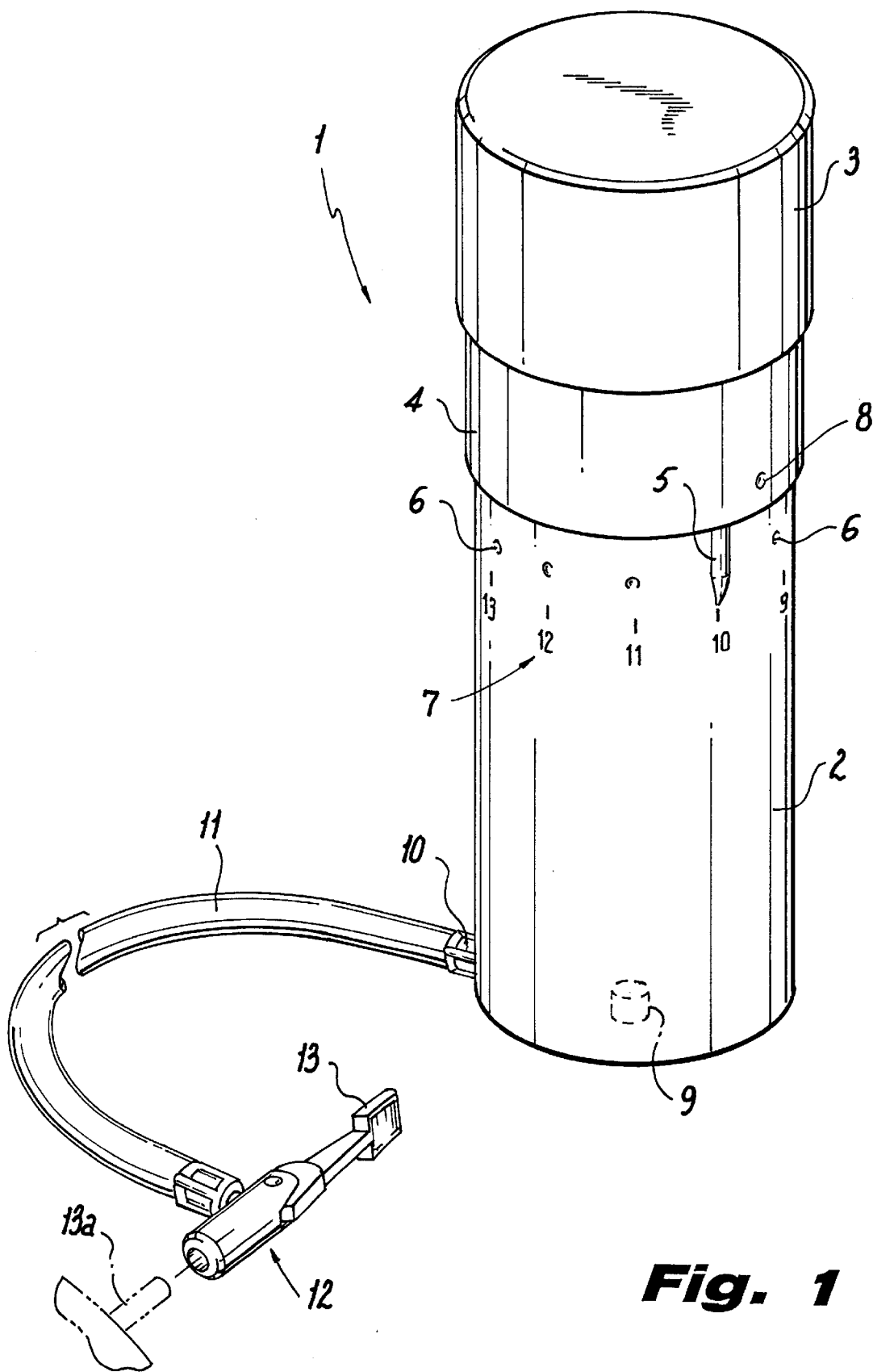
FIG. 1 is a perspective view of a tire deflation device of the present invention.

The tire deflator 1 is shown in FIG. 1. It is a tubular device with markings 7 showing desired terminal pressure in pounds per square inch (psi). Click stop indentations 6 are provided at 1 psi intervals, which click stop indentations 6 interact with springy pointer 5, which has a small protrusion on its reverse side (not shown). Click stop indentations 6 can be made at more frequent intervals, and metric indications can be used instead.

Calibration cap 3 is spot welded 8 to threaded cap portion 4 during manufacture. Housing 2 contains the internal mechanisms and pneumatic components. Hose 11, terminating in pneumatic chuck 12 with handle 13, attaches deflator 1 to a conventional tire valve 13a, such as are commonly used on bicycle tire pumps or small electric tire pumps.

In operation, the user simply turns cap 3 about threaded portion 4 relative to housing 2, to the desired terminal pressure click stop indentation 6, as indicated by indicia number 7 on housing 2. The user then attaches hose chuck 12 to the tire valve by using handle 13, to lock hose chuck 13 on. Furthermore, hose chuck 13 has an internal pin which forces open the tire valve.

The deflation process commences when pressure release pin 9 on the bottom of the deflator 1 is pressed in so that pressure release pin 9 snaps to its inward stable position. When deflation exhaust of air occurs and the desired tire pressure is reached within the vehicle tire, pin 9 automatically snaps out, sealing the pressure release aperture. At this point, the user disengages hose chuck 12 from the tire valve by using handle 13 to release hose chuck 12.

The basic operating principle of tire inflator 1 is the balancing of spring force with the force of a piston in a pneumatic cylinder. Ordinary pneumatic cylinders use rubber seals with grease lubricant between the cylinder and piston. This is not adequate for a device using a cylinder to assess pressure due to the "stick/slip" characteristics of the sliding seal which results from the differences between static and dynamic friction. One solution is to use a special pneumatic cylinder such as those supplied by AIRPOT Corp. of Norwalk, Conn. These use no seals. Instead a precision fit between a graphite piston and a glass cylinder is used. Cost and fragility are two negative attributes. An elastomeric bellows or a metal bellows combining the spring function can be used effectively in this design.

Figure 2:
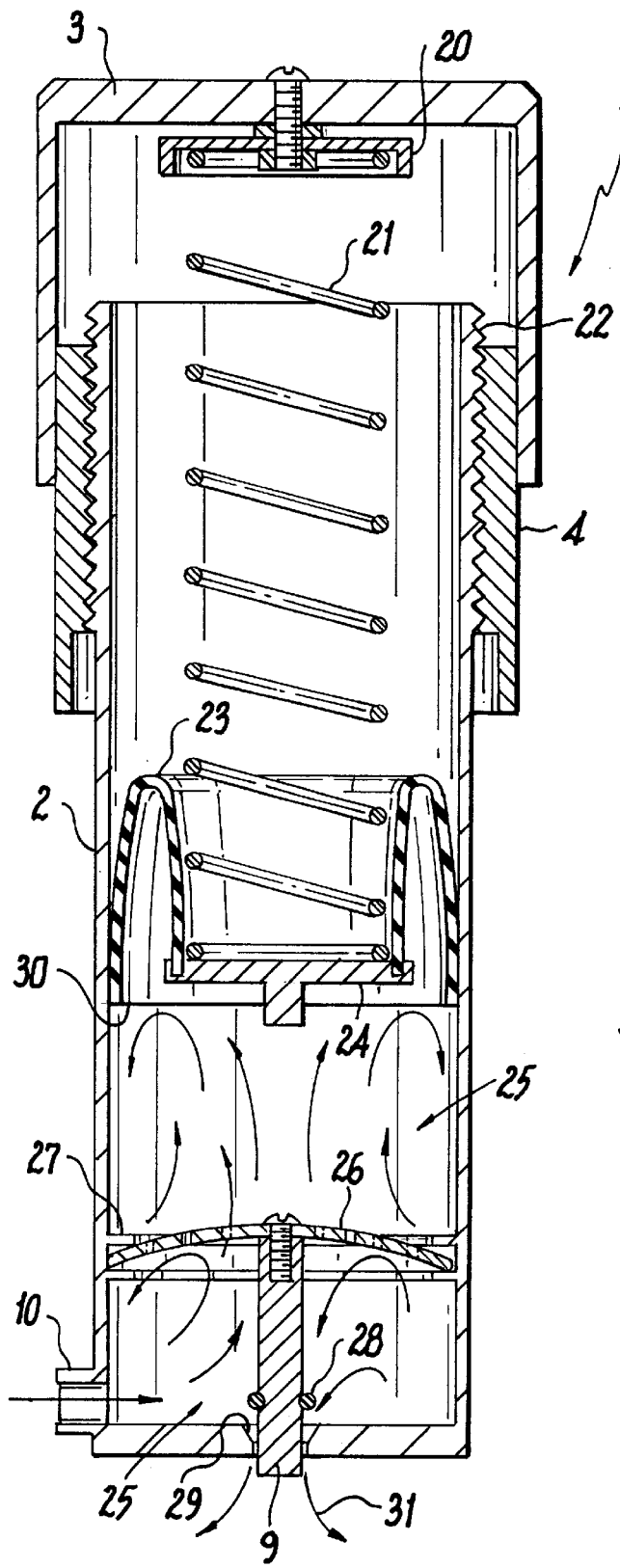
FIG. 2 is a side elevational view in cross section of the device in a venting phase.

The preferred embodiment uses a rolling diaphragm pneumatic cylinder as shown in FIG. 2 as the best low-cost reliable choice. This type of pneumatic actuator uses an elastomeric sleeve folded upon itself and attached in a gas-tight fashion to both the cylinder as well as the piston. It therefore eliminates the need for a sliding seal and makes the piston force a true representative of air pressure.

FIG. 2 shows a side internal view of deflator 1 in the pressure venting phase. The lower portion is sealed by elastomeric rolling diaphragm 23 attached to housing 2 at annular joint 30 at a distal edge and to movable piston 24 at a proximal annular center edge. Compressed air from the attached tire is admitted by connector 10 to hollow chamber 25 and freely communicates with piston 24 through diaphragm 26, such as a perforated metallic dome, which diaphragm 26 is shown in its upper stable position where diaphragm 26 moves O-ring 28 on pin 9 away from valve seat 29, thus permitting air discharge 31.

Compression coil spring 21 balances the pneumatic force on movable piston 24. The amount of precompression of spring 21 is adjusted by screw threads 22 engaging cap having threaded portion 4 with housing 2. The top of coil spring 21 is received in pivoting cup 20 which can rotate freely in cap 3.

The upper portion of housing 2 is vented to the ambient environment through loose threads 22 as well as the screw opening for pivoting cup 20.

Figure 3:
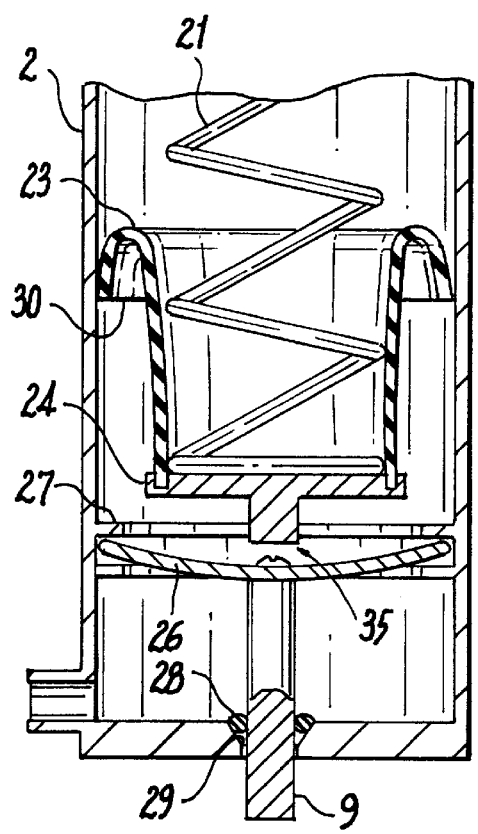
FIG. 3 is a side elevational phantom detail of the device in a sealed position.

As shown in FIG. 3, it can be appreciated that as the pressure inside the bottom portion of housing 2 decreases, the spring 21 will elongate pushing piston 24 downward until it flattens diaphragm 26 past its midpoint so that diaphragm 26 snaps down to its lower stable position. The edges of diaphragm 26 are constrained by groove retainers 27. Before hose 11 is detached from the tire, at the end of the deflation process a small gap 35 exists between movable piston 24 and diaphragm 26. Pin 9 then brings O-ring 28 in communication with valve seat 29, so that the valve of pin 9 and O-ring 28 again seats acting as a check valve to prevent further deflation. Diaphragm 26 actuates the discharge valve with a "snap-action" to insure repeatability.

If spring 21 is prestressed more, by screwing down cap with threaded portion 4, it then takes more pressure to balance the bottom of moveable piston 24 in the vicinity of diaphragm 26, thereby increasing the pressure at which pin 9 snaps down to seal hollow chamber 25. Thus the amount of deflation would be less. By matching springy pointer 5 with a desired click stop indentation 6 at indicia number 7, in this manner, the set point as dialed-in actually accomplishes the desired level of deflation.

Figure 4:
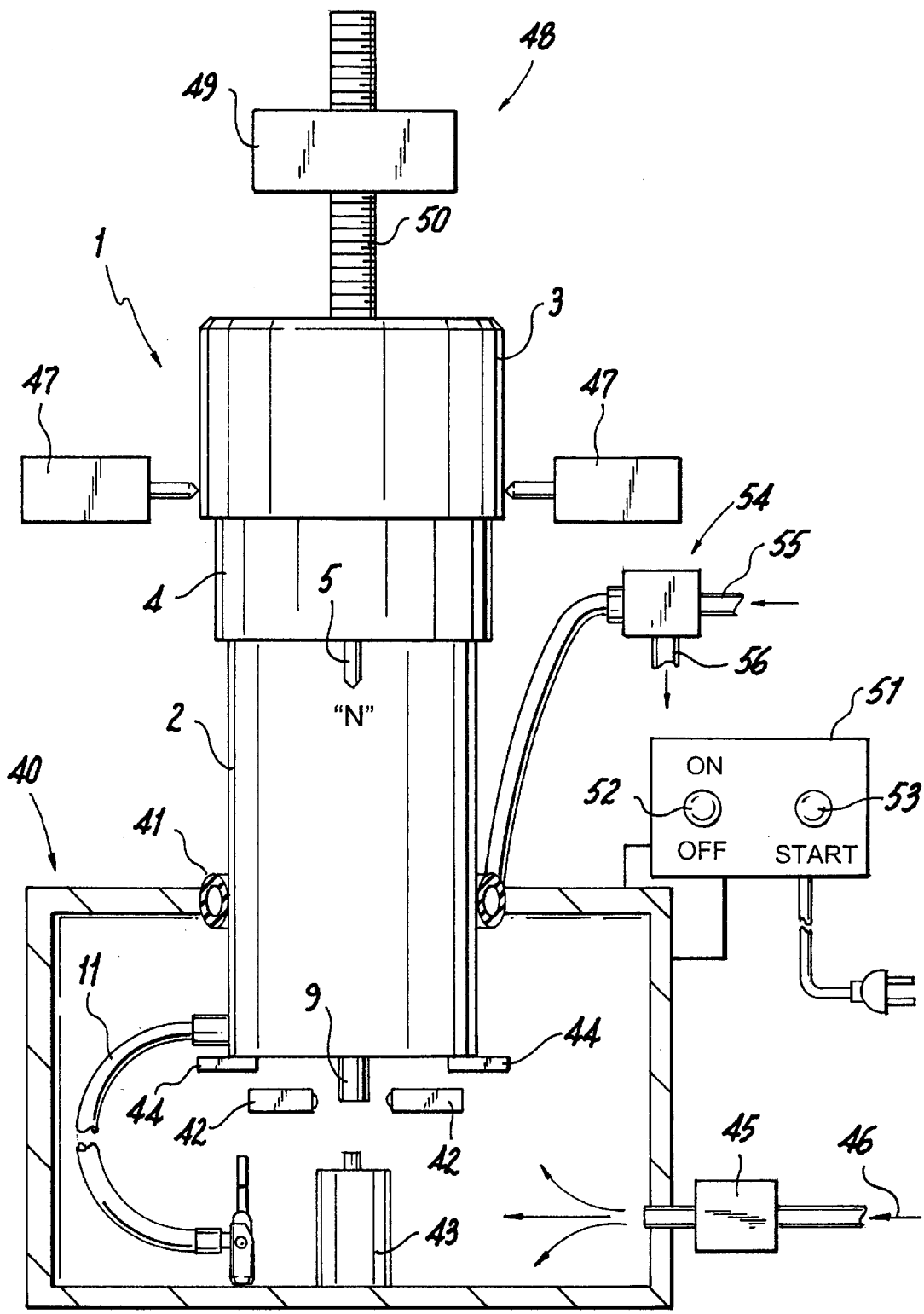
FIG. 4 is a side elevational view in partial phantom of a calibration system used to calibrate the device.

FIG. 4 shows a calibration subsystem that can be used at manufacture of deflator 1. It calibrates each deflator 1 at the center of the expected terminal pressure range. If the most frequently used terminal pressure range is 8 to 12 psi for example, the calibration pressure selected would be 10 psi. In FIG. 4, this selected pressure is denoted as "N" under pointer 5. The subsystem includes pressure-tight housing 40 and a variety of components controlled by controller 51, which includes a microprocessor.

After deflator 1 is adjusted to pre-selected pressure "N", it is partially inserted in housing 40 until it bottoms out on supports 44. Inflatable gasket 41 seals housing 2 to chamber 40 by using "shop air" (70–90 psi) through solenoid valve 54. At the time deflator 1 is inserted, cap 3 is not permanently attached to threaded portion 4, but it is a sliding fit only. Cap 3 is at the high end of its adjustment with spring 21 internally at its full length.

Figure 5:
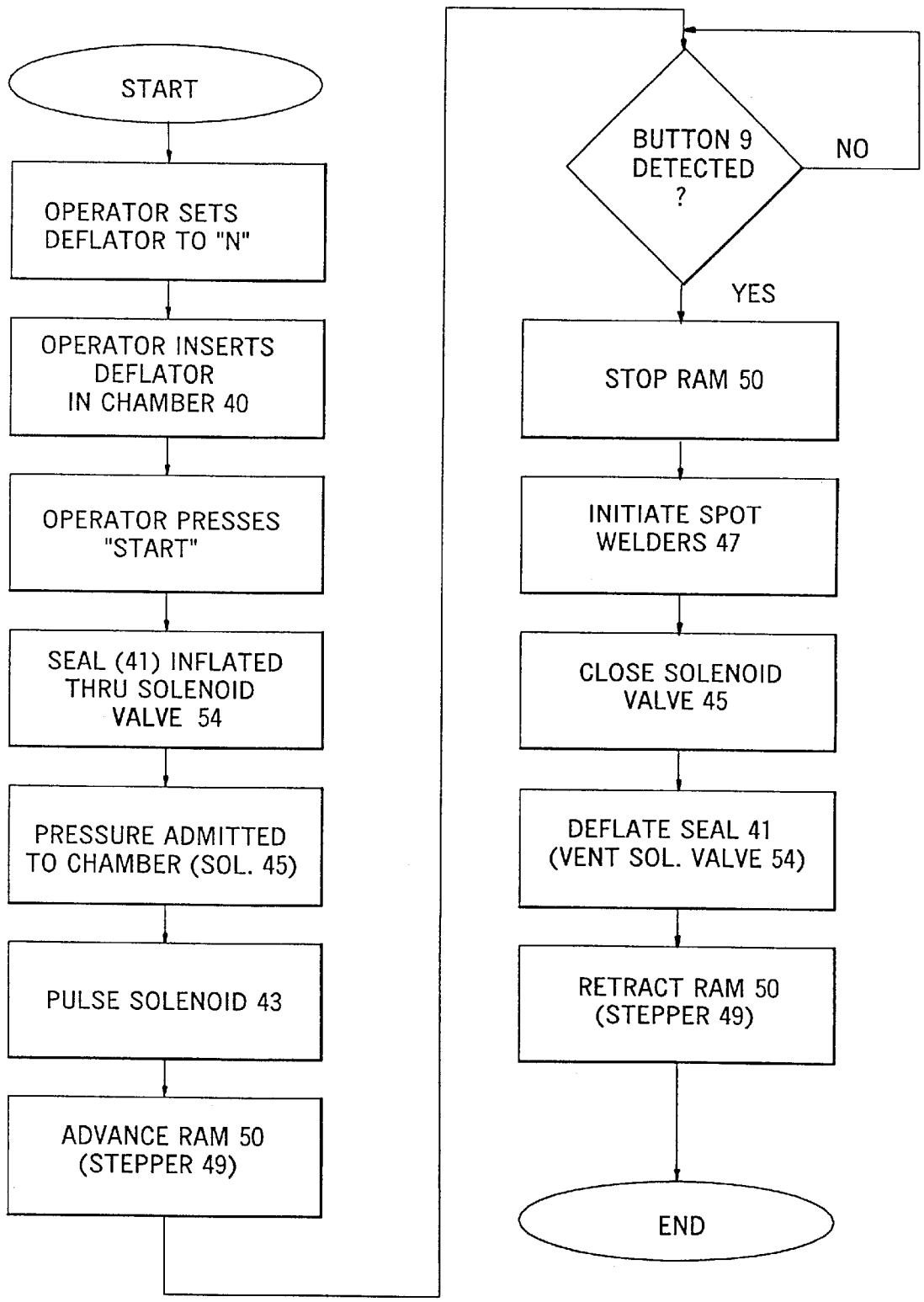
FIG. 5 is a flow chart of the calibration method as in FIG. 4.

The start button 53 initiates the inflation of gasket 41. Next, air 46 at pressure "N" is admitted to chamber 40 through first solenoid valve 45. Further solenoid 43 is pulsed, snapping pressure release pin 9 of deflator 1 to it upward venting position. Next, linear actuator 48 including leadscrew ram 50 driven by stepper motor 49, pushes down cap 3 in small increments until pin 9 snaps down into desired the sealing position within housing 2 of deflator 1. This event is detected by optical sensor pair 42 which signals the controller to stop the ram 50. Spot welders 47 are energized to permanently attach cap 3 to threaded portion 4, thereby calibrating deflator 1. Then ram 50 is retracted, solenoid valve 45 is shut off and another solenoid valve 54 is set to vent position, to vent seal 41 to vent outlet 56. Calibrated deflator 1 is then removed and the next deflator is inserted. FIG. 5 is a flowchart detailing the calibration method noted above.

The calibration method of FIGS. 4 and 5 has been described as a welding operation. This works on both metal as well as thermoplastic materials; both can be used for deflator 1. As an alternative, adhesive dispensers using a cyanoacrylate instant adhesive, or a UV cured adhesive can be substituted for the welders shown, wherein the seam between cap 3 and threaded portion 4 is adhesively bonded.

It is known that other modifications may be made to the present invention, without departing from the scope of the invention, as noted in the appended claims.

I claim:

1. A deflation pressure regulator for automatically insuring accurate user-selected deflation pressure of a compressed gas within a pressurized gas container, comprising:
   a. threaded attachment means for attaching the regulator to a pressurized gas container;
   b. said regulator comprising a valve body connected to said threaded attachment means for permitting exhaust of gas from an over-pressurized gas container;
   c. said valve body containing a spring for actuating a first diaphragm, said spring being compressed by a user adjustable threaded cap for selecting the pressure to which said pressurized gas container is being deflated;
   d. said valve body also containing means for selectively releasing gas from said container or closing off release of said gas through said valve body when the selected pressure is reached comprising a relief valve slidable between an open position and a closed position, a second diaphragm within said valve body connected to said relief valve having only two positions which correspond to the open and closed positions of said relief valve, and means connected to said first diaphragm for contacting said second diaphragm to move the latter into the relief valve closed position when the pressure of said pressurized gas drops to the selected pressure.

2. The device of claim 1 where the pressurized gas container is a pneumatic vehicle tire.

3. The device of claim 1 having a user-selectable deflation pressure scale on the exterior for user pre-selection of deflation pressure.

4. A method of pressurizing a gas container to a preselected pressure comprising the steps of:
   a. inflating the gas container to a pressure above the preselected pressure;
   b. turning a threaded pressure adjustment cap of a regulator to the desired gas pressure setting; and
   c. attaching said regulator to the over-pressurized gas container, said regulator comprising a valve body containing spring for actuating a first diaphragm, said spring being compressed by said threaded cap for selecting the pressure to which said pressurized gas container is being deflated, said valve body also containing means for selectively releasing gas from said container or closing off release of said gas through said valve body when the selected pressure is reached comprising a relief valve slidable between a closed position and an open position, a second diaphragm within said valve body connected to said relief valve having two positions corresponding to the open and closed positions of said relief valve, and means connected to said first diaphragm for contacting said second diaphragm to move the latter into the relief valve closed position when the pressure of said pressurized gas drops to the selected pressure.

* * * * *